United States Patent [19]

Shaver

[11] Patent Number: 5,428,614
[45] Date of Patent: Jun. 27, 1995

[54] EXPECTED VALUE DATA FRAMER AND METHOD

[76] Inventor: Christopher J. Shaver, 14095 SW. Walker Rd., #53, Beaverton, Oreg. 97005

[21] Appl. No.: 589,115

[22] Filed: Sep. 26, 1990

[51] Int. Cl.6 .......................... H04L 7/08; H04J 3/24
[52] U.S. Cl. .................. 370/94.1; 370/105.1; 370/106; 375/368
[58] Field of Search ............ 370/94.1, 94.2, 60, 370/60.1, 99, 105.1, 105.4, 106; 340/825.44; 455/33, 54; 375/116, 114

[56] References Cited

U.S. PATENT DOCUMENTS

| | | | |
|---|---|---|---|
| 4,713,808 | 12/1987 | Gaskill et al. | 370/94.1 |
| 4,764,920 | 8/1988 | Furuya | 370/94.1 |
| 4,815,071 | 3/1989 | Shimizu | 370/94.1 |
| 4,868,561 | 9/1989 | Davis | 340/825.44 |
| 4,910,510 | 3/1990 | Davis | 340/825.44 |
| 4,962,377 | 10/1990 | Wallace et al. | 340/825.44 |
| 4,974,223 | 11/1990 | Ancheta et al. | 370/94.1 |
| 4,995,099 | 2/1991 | Davis | 340/825.44 |
| 5,072,449 | 12/1991 | Enns et al. | 370/94.2 |

*Primary Examiner*—Douglas W. Olms
*Assistant Examiner*—Hassan Kizou
*Attorney, Agent, or Firm*—Elmer Galbi

[57] ABSTRACT

A framer for a data receiver operates by anticipating particular variable data bits to be sent in a desired group of data, and framing the desired group of data in a received signal by detecting the anticipated data bits in predetermined bit positions therein. The invention is illustrated with reference to a packet-based paging system.

2 Claims, 6 Drawing Sheets

EXPECTED VALUE DATA FRAMER AND METHOD

FIELD OF THE INVENTION

The present invention relates to data communications systems, and more particularly relates to a method and apparatus for framing a received serial data stream into packets for decoding.

BACKGROUND AND SUMMARY OF THE INVENTION

In some data communications systems which employ serial data links, the receiving station must not only receive the raw data, but it must also discern from the data the beginning and end of desired groupings of bits so that the data communicated thereby can be properly decoded. In one prior art system this is accomplished by use of a predetermined sequence of "flag" bits between packets (see for example U.S. Pat. Nos. 4,713,808 and 4,897,835). The flag bits can for example be, a 20-bit flag comprised of four "1"s, four "0"s, three "1"s, three "0"s, two "1"s, two "0"s, one "1," and one "0" ("11110000111000110010"). In such a system this flag is inserted between each pair of packets. When the receiver detects this sequence in the incoming data, it recognizes the sequence as a flag and treats the following bits as the beginning of a new packet. This process of segregating incoming data into desired groupings is commonly known as framing.

In one prior art system, the packets into which the data are organized are always 240 bits in length. Several of the packet's component fields are dedicated to protocol data, such as data indicating the time slot number in which the packet is transmitted and a format code indicating the type of data the packet contains. The remainder of the packet is available for transmitting message data. If a message is too long to send in one packet, rather than lengthening the packet, the system distributes the message data among several chained packets. The certainty of the packet length permits a received packet to be properly framed even if one of the two flags adjoining it is corrupted. This is accomplished by providing circuitry in the associated receiver that checks for both the leading and trailing flags surrounding a packet and considering the packet properly framed if either flag is detected.

The particular circuitry that can be used to implement this leading/trailing framer comprises a 281-bit shift register through which the serial data is clocked as it is received. A first flag detect circuit checks bits 1 through 20 each clock cycle to determine whether they match the known 20-bit flag pattern. A second flag detect circuit similarly checks bits 261 through 280. (Bit 281 is checked in an auxiliary flag detect circuit discussed more fully below). If either the first or second flag detect circuits detects the known flag sequence, the data in bits 21 through 260 are considered to comprise a properly framed 240-bit packet. These 240 bits are then latched into a memory circuit and processed, while newly received serial data continues to be introduced into the shift register for framing of the next packet.

It will be recognized that a happenstance occurrence of the flag sequence bits embedded in the packet data results in an improperly framed packet. To minimize this problem, it is desirable to use relatively long flag sequences, since each additional bit halves the likelihood of this type of framing error. However, as the flag sequences are lengthened, the likelihood that the flags themselves may be corrupted during transmission also increases. If two consecutive flag sequences are corrupted, then even the leading/trailing framing technique described above will fail in framing the packet therebetween.

From the foregoing, it will be recognized that framing techniques are subject to two principal sources of error: corruption of true flag sequences (preventing framing), and embedded false flag sequences (causing improper framing). It is an object of the present invention to provide an improved packet framing system in which the effects of these error mechanisms can be minimized.

In accordance with the present invention, this object is achieved by anticipating particular variable data bits that will be found in a desired grouping of data, and framing the desired group of data in the received signal by detecting the anticipated data bits in predetermined bit positions.

The foregoing and additional objects, features and advantages of the invention will be more readily apparent from the following detailed description thereof, which proceeds with reference to the accompanying drawings.

DETAILED DESCRIPTION

The present invention is described herein as applied to a prior art paging system of the type shown in U.S. Pat. Nos. 4,713,808 (Gaskill), 4,897,835 (Gaskill), 4,885,802 (Ragan) and 4,893,341 (Gehring). Such a system is being commercially operated by AT&E Corporation, Nimbus Avenue, Portland, Oreg. and associated wristwatch paging radio receivers are being marketed under the trademark SEIKO RECEPTOR MESSAGEWATCH. It will be recognized, however, that the invention can advantageously be applied to a variety of serial communications systems.

Figure 1:
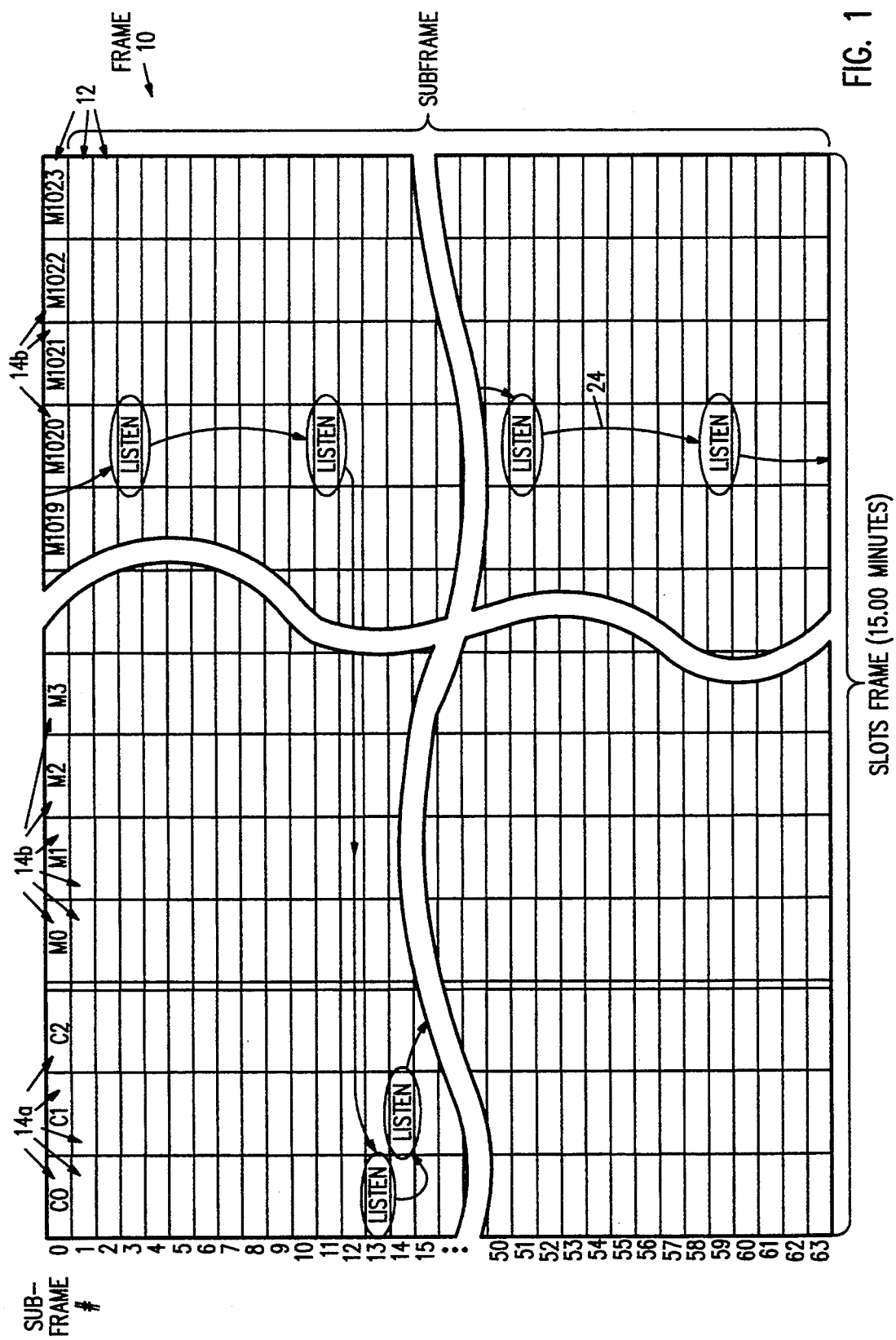
FIG. 1 is a diagram illustrating a frame of data and its constituent subframes and time slots in the protocol with which the present invention is described.
Figure 2:
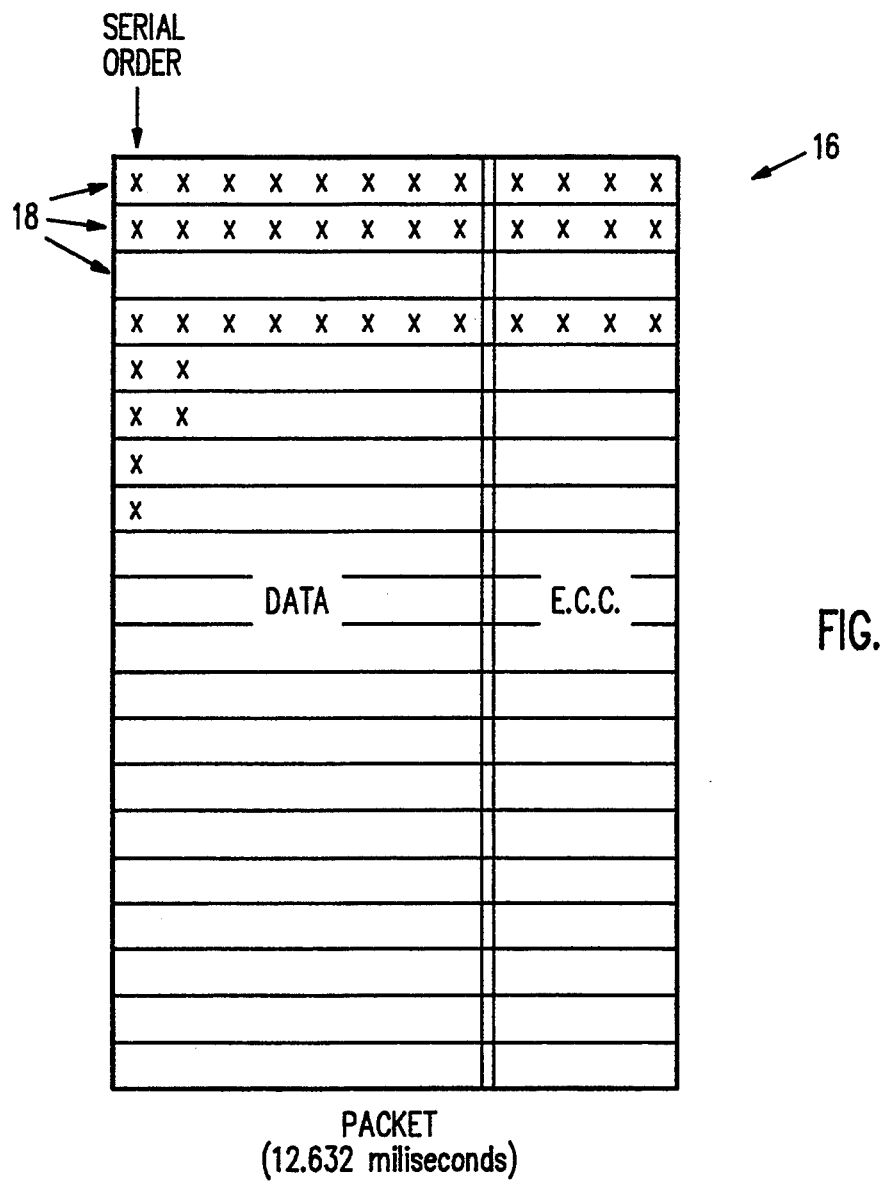
FIG. 2 is a diagram illustrating a packet of data sent in a time slot of the frame of FIG. 1.

In the paging system used herein to illustrate the present invention, data is transmitted in a protocol that is divided into frames, subframes and time slots. Each time slot can convey one packet of information. FIGS. 1 and 2 show these relationships diagrammatically. A frame 10 is shown in FIG. 1 and is comprised of 64 subframes 12, numbered 0 through 63. Each subframe, in turn, is comprised of 1027 time slots 14. The first three time slots 14a in each subframe are control slots (designated C0 through C2 in FIG. 1) in which packets of control information (such as time of day and local channel lists) are sent. The following 1024 time slots (here designated M0 through M1023) are numbered message slots 14b in which packets of message data are sent.

Each packet 16, shown in FIG. 2, is comprised of 20 12-bit words 18 composed of an 8-bit data octet 18a and an associated 4-bit Hamming error correcting code (ECC) 18*b*, for a total of 240 bits. The error correcting code 18*b* permits correction of any 1-bit error in the 12-bit word of which it is a part. If two or more bits are corrupted, however, the word cannot be recovered. To minimize uncorrectable errors due to burst noise, the data bits represented in FIG. 2 are not sent sequentially, left to right, top row down to bottom, but are rather sent in columns: the first bit of the first word, followed by the first bit of the second word, etc. etc. The bits are then restored to their proper groupings by circuitry in the receiver. The last two data octets of the packet are cyclic redundancy check words.

Figure 3:
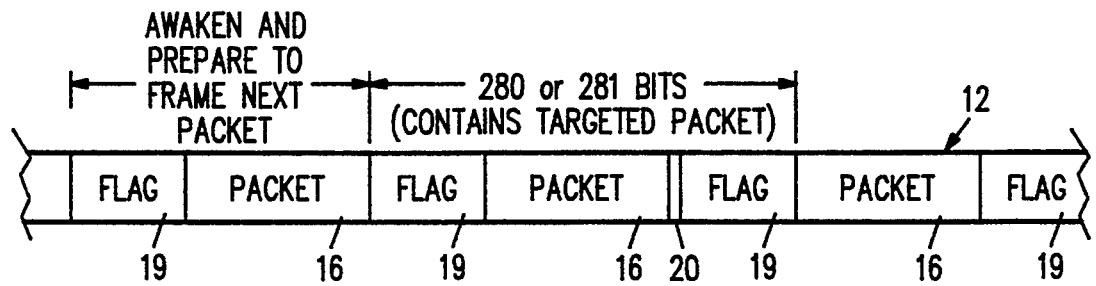
FIG. 3 is an excerpt of a subframe.
Figure 4A:
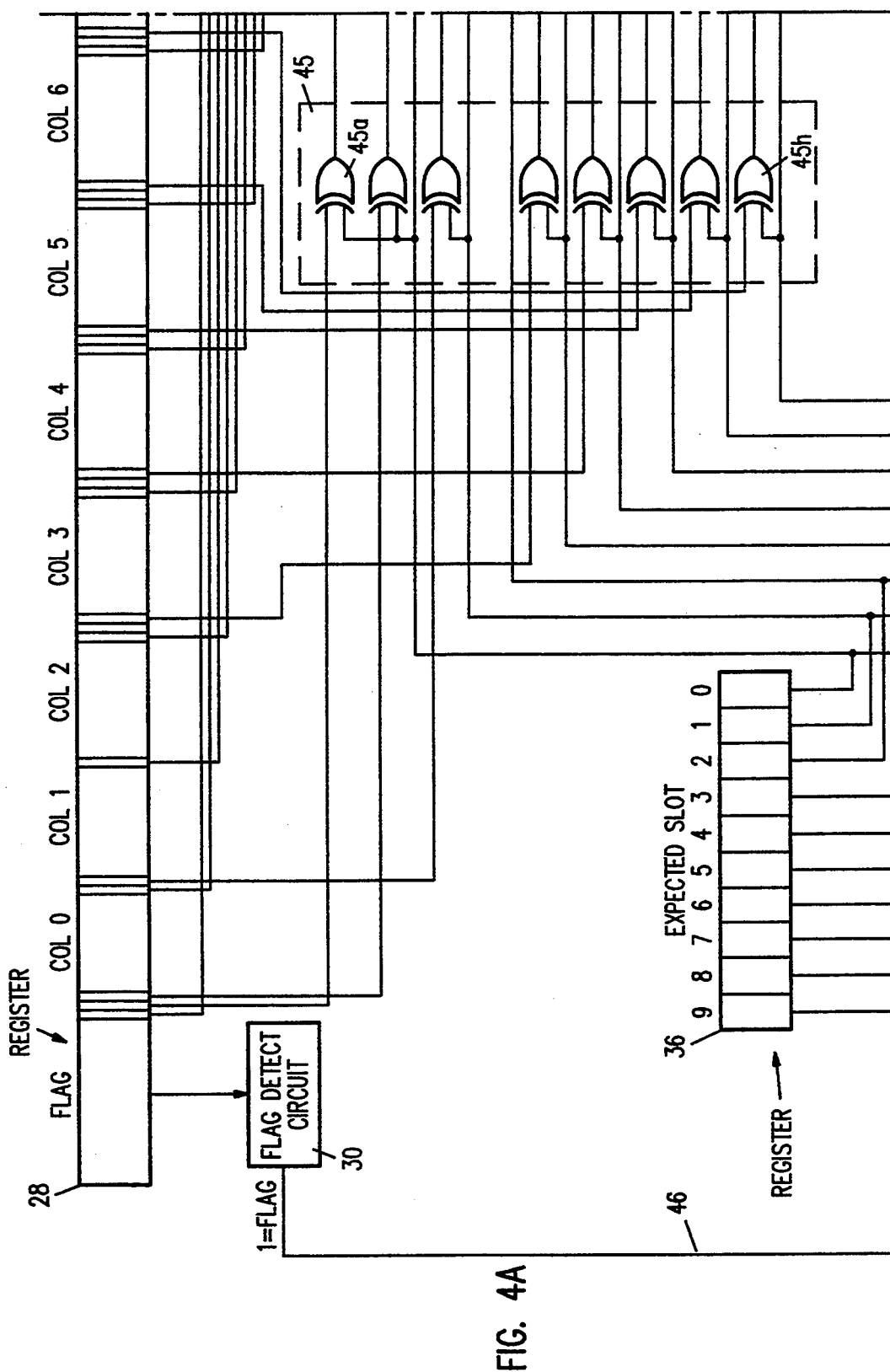
FIG. 4 is a schematic block diagram of a framing apparatus according to one embodiment of the present invention.
Figure 4B:
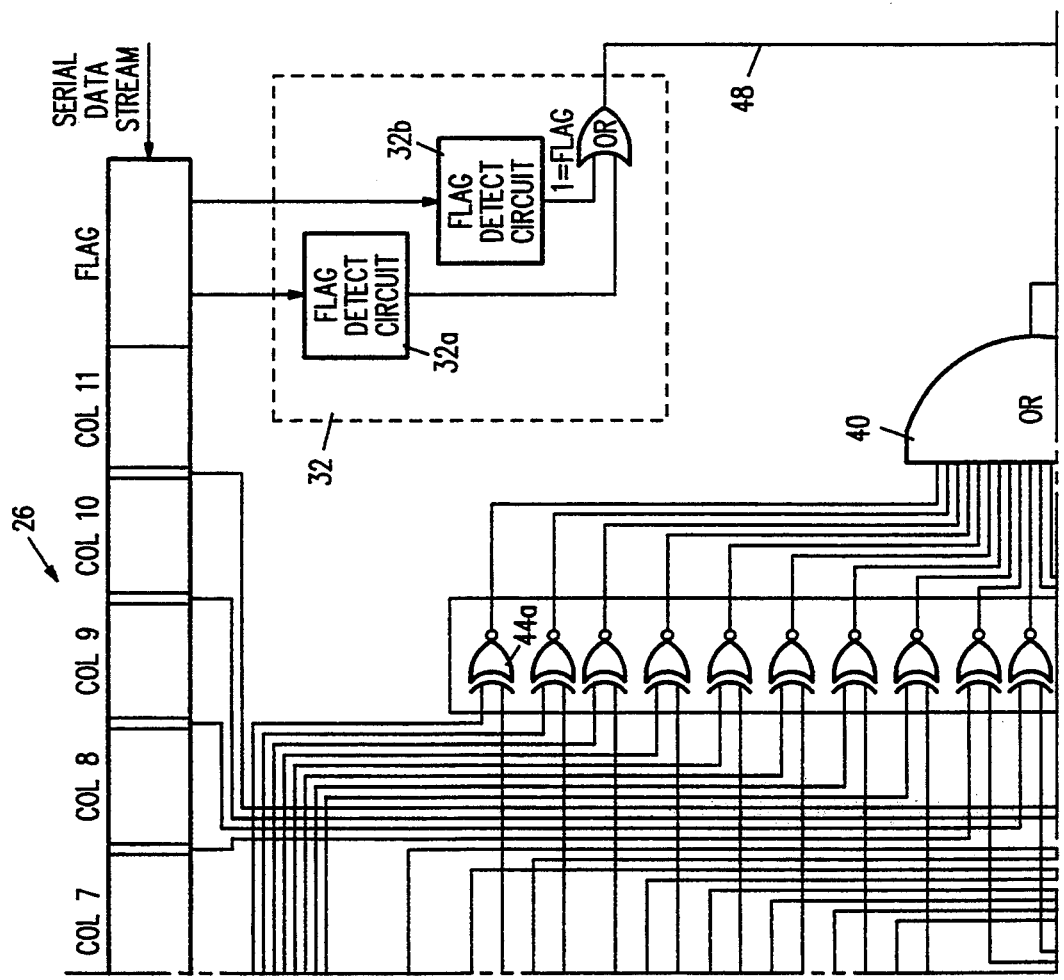
Figure 4C:
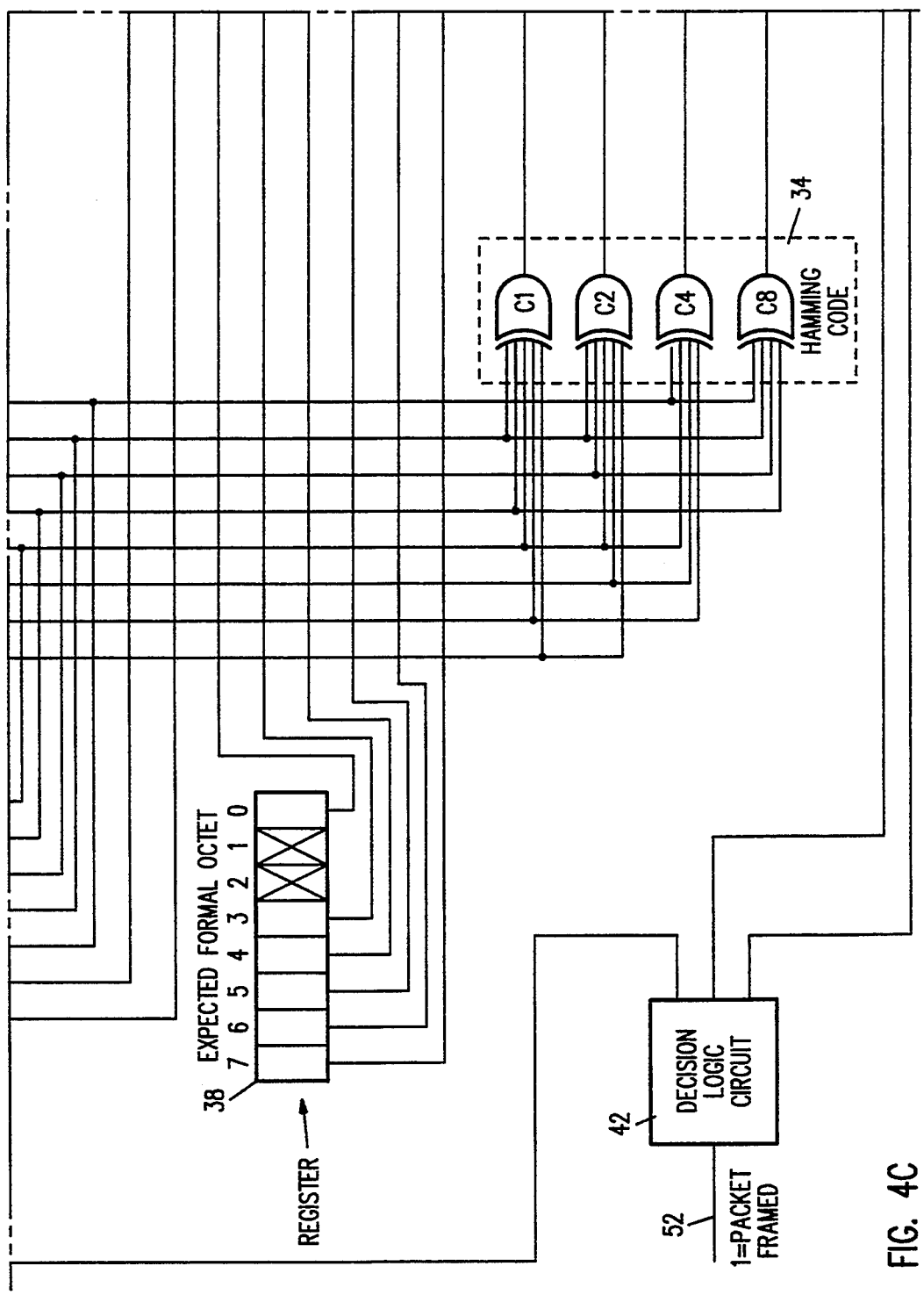
Figure 4D:
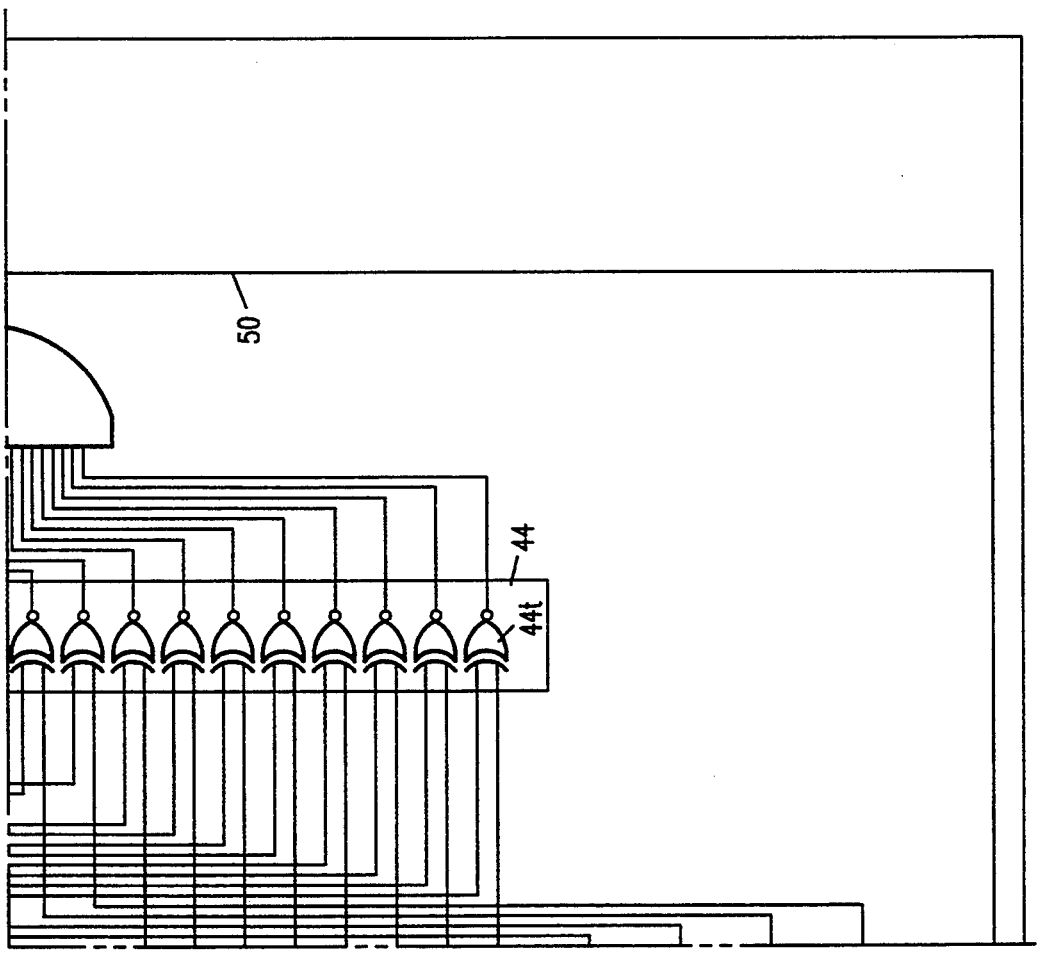

In formatting each subframe 12, the prior art transmitting station inserts a flag sequence 19 comprised of the 20 bits "11110000111000110010" after each 240-bit packet 16. Further, the transmitter may infrequently insert a single pad bit 20 between the end of a packet and the beginning of the flag pattern. The purpose of the pad bit is to slightly lengthen the subframe so as to permit synchronization with a reference time base. FIG. 3 illustrates an excerpt of a representative subframe 12 showing the alternating packets 16, flags 19, and the occasional pad bit 20.

The receivers used with the system described herein are typically battery powered devices that normally are in a standby state, but awaken for brief intervals to monitor selected time slots in which packets addressed to particular receivers may be transmitted. As an example, a receiver may awaken ten different times during a frame 10, eight times to listen for message packets 14*b*, and twice to listen for control packets 14*a*. Part of this sequence is shown by line 24 in FIG. 1, where each circle represents a listening interval.

The particular sequence of time slots and subframes to which the receiver will awaken and listen in this prior art system is determined by a fixed 32-bit registration code that uniquely identifies each receiver and is stored therein. The least significant 10 bits of this code comprise a datum which indicates the message time slot number to which the receiver will ordinarily tune. For example, if these bits are "0000010001" ($17_{decimal}$), the receiver will awaken for the 17th time slot in the targeted subframes.

The targeted subframes are similarly determined by this registration code, particularly by its next three least significant bits. The receiver awakens during the subframes for which these bits match the least significant bits of the subframe number. For example, if these bits are "011", the receiver will awaken during subframes "000011" ($3_{decimal}$), "001011" ($11_{decimal}$), "010011" ($19_{decimal}$), "011011" ($27_{decimal}$), "100011" ($35_{decimal}$), "101011" ($43_{decimal}$), "110011" ($51_{decimal}$) and "111011" ($59_{decimal}$).

Sometimes, the time slot to which a receiver tunes contains a pointer to another time slot. This occurs, for example, when the transmitting station has messages which are to be directed to two or more receivers that monitor the same time slots in the same subframes (i.e. a message conflict). Instead of carrying a message, the packet then contains pointers directing the conflicting receivers to different, otherwise unused time slots.

The receivers also periodically tune to control slots to receive updated time and administrative data. A C0 control slot is the first slot to which a receiver tunes after it has scanned to locate a paging signal. Included in the C0 packet is a datum indicating how often the receiver should divert from its usual message reception routine to receive another control packet. A typical value is once every forty minutes. The receiver's microprocessor stores this datum and takes note of the current time of day, so that after the appropriate time interval has elapsed, the microprocessor will know to target another control packet.

At the conclusion of each brief listening interval, just before returning to its standby state, each prior art receiver determines from its registration code, or from a pointer received in the last targeted packet, or from a check of the time elapsed since the last control packet update, the subframe and time slot at which it must next awaken. With knowledge of the next targeted time slot number and with knowledge of the length of a single time slot (13.68421 milliseconds), the receiver sets a 21-bit register called the "comparison register" or "comparator". Then, when the counter equals the comparison register, an interrupt is generated to the receiver's control microprocessor, causing the receiver to awaken again and tune to receive another packet. (The awakening time can be anytime during the packet preceding the targeted packet, or after the first bit of the flag preceding that packet, as shown in FIG. 3.)

In accordance with the present invention, the receiver's prior knowledge of the time slot number for which it will next awaken enables the receiver to anticipate certain of the data contained in the targeted packet. This is made possible by the fact that the time slot number is one of the data included in each packet sent in this prior art protocol. In particular, the time slot number is sent as a 10-bit datum comprised of the eight bits of the first octet together with the first two bits of the second octet. Since these data bits are known by the receiver in advance, they can be used to help frame the incoming data.

Actually, a receiver according to the present invention has prior knowledge of a total of 20 bits in the targeted packet. Eight bits of the transmitted time slot number datum comprise an octet for which a corresponding error correcting code is sent. The receiver can compute this 4-bit code knowing the eight bits on which it is based. Further, the receiver has advance knowledge of whether the targeted packet for which it will next awaken is a control packet or a message packet. The transmitter formats each packet with a format code octet, sent as the third octet, that indicates whether the packet is a control or message packet. If the targeted packet is a control packet, the format octet comprises bits "11100XX1" (the bits represented by the "X"s depend on the particular type of data being transmitted in the control slot and is not always known in advance). If the targeted packet is a conventional message packet, the format octet comprises bits "11100XX0." If the targeted packet is a message packet that has been redirected from an earlier time slot in which there was a message conflict, the format octet comprises bits "01100XX0." Since the receiver knows in advance whether it is listening for a control packet, a conventional message packet, or a redirected message packet, it can anticipate six of the eight format bits.

FIG. 4 illustrates a framing apparatus 26 according to the present invention that relies, in part, on the detection of these twenty expected data bits in the received data stream as an aid to framing. Framer 26 includes a 281-bit shift register 28, leading and trailing flag detect circuits 30, 32, a Hamming code generator circuit 34, a 10-bit memory 36, a six-bit memory 38, an expected data detector circuit 40, a decision logic circuit 42, and a plurality of 2-input XOR and XNOR gates 44, 45.

In operation, the leading flag detect circuit 30 checks bits 1-20 of the shift register 28 against the 20-bit flag sequence. If the flag sequence is detected, circuit 30 produces a logic "1" signal on output line 46. The trailing flag detect circuit 32 performs the same operation on bits 261-280 of the shift register 28 and produces a logic "1" signal on output line 48 if a trailing flag sequence is detected.

In one form of the invention, the trailing flag detect circuit 32 actually comprises two circuits having their outputs ORed together. The first, 32a, checks bits 261-280 for the flag sequence. The second, 32b, checks bits 262-281. Normally, when a packet is properly framed, flag sequences are positioned at bits 1-20 and at bits 261-280. However, if a pad bit 20 has been inserted by the transmitter between the packet and the trailing flag, the trailing flag will be displaced one bit and will be found at bits 262-281 instead of at bits 261-280. By providing two ORed trailing flag detect circuits 32a, 32b staggered one bit apart, the trailing flag can be detected irrespective of the presence of a pad bit.

In another form of the invention, both trailing flag detectors are not needed. In this form, 1 of 3 true signals is used and there can only be one detector.

At the end of each brief listening interval, just before returning to its standby state, a receiver according to the present invention determines the 10-bit number that identifies the time slot of the next targeted packet, and the six format bits the receiver expects to detect in that packet. These sixteen bits are then provided to memories 36, 38 for comparison in the next awake interval with bits in the corresponding positions of the shift register 28. The first eight bits of the slot number data are applied from memory 36 to the Hamming code generator 34 for generation of the expected 4-bit error code corresponding thereto. Finally, the shift register is reset to contain all zeros.

During the next awake interval, these twenty expected bits are compared by twenty XNOR gates 44a to 44t with data at predetermined bit positions of the shift register 28 as the serial data is clocked therethrough. XOR gates 45a to 45h perform a derandomization function (each octet is "randomized" by XORing with the eight low order slot bits before being sent, and so must be derandomized upon reception). The XNOR gates 44a to 44t perform the actual comparison. The twenty outputs of these XNOR gates are applied to an expected data detector circuit 40, which here comprises a 20-input AND gate. When all twenty bits are detected at the expected locations, the expected data detector circuit 40 produces a logic "1" signal on its output line 50, signifying that the packet is properly framed by the expected data criterion.

The decision logic circuit 42 monitors the signals produced by the flag detect circuits 30, 32 and the expected data detector circuit 40 on lines 46, 48 and 50, and produces a logic "1" signal on line 52, signifying "Packet Framed," when a predetermined logic condition is met.

In a first form of the present invention, the decision logic circuit 42 produces the "Packet Framed" signal when at least one of the three signals goes high. This can be achieved simply by ORing the three lines 46, 48 and 50 together.

In a second form of the present invention, the decision logic circuit 42 produces the "Packet Framed" signal when any two of the three signals goes high.

The first form of the invention is desirable if the flag sequences are lengthy, to thereby reduce the risk of a false flag being embedded in the packet data. While such a lengthy flag is more likely corrupted, only one of the three framing criteria need be met to consider the data properly framed.

The second form of the invention is desireable if the flag sequences are short, to thereby reduce the likelihood of their being corrupted. While such a short flag is more likely falsely embedded in the packet data, a single embedded flag is not sufficient to yield a "Packet Framed" signal; one of the leading or trailing flags must be detected too.

The theoretical performance of different framing techniques can be computed mathematically as a function of the bit error rate (BER) of the transmission medium. To illustrate, in a simple framer that detects only the leading flag and assumes the following 240 bits comprise the packet, the performance (the "packet completion rate"—PCR) can be computed as follows:

Let Q be the probability that a given bit is good. Q then equals 1-BER. The probability that the leading 20-bit flag will be received uncorrupted is $Q^{20}$. Further, to receive each 12-bit word in the packet, either eleven or twelve of the bits must be received uncorrupted. (If eleven, the ECC code can correct the twelfth.) This probability is $Q^{12}+12[BER*Q^{11}]$. Since there are 20 such words in a packet, the overall probability of proper reception is $Q^{20}[Q^{12}+12(BER*Q^{11})]^{20}$.

If the bit error rate is 0.001, the packet completion rate for the leading flag only framer is 97.89%. If the bit error rate increases to 0.01, the packet completion rate falls to 72.26%.

While the derivation of packet completion rate for a framer according to the illustrated form of the present invention is complex, the final expression is as set forth below:

$$PCR = Q^{240}[12-11Q]^{20}(2-Q^{20}) + [1-Q^{20}]^2 Q^{221}[1-0-9Q][6-5Q][12-11Q]^{17}$$

To compare with the 97.89 and 72.26 percent packet completion values calculated for the leading flag framer, the corresponding percentages for the illustrated framer are 99.868 and 87.85 percent. These figures take on added meaning when compared with the ideal case, in which no framing is required. (In the ideal case, the time base is perfectly accurate, so the receiver can awaken at the precise instant the first bit of the packet is being transmitted and receive the packet without needing to discern where in a serial data stream the packet begins. The only errors in the ideal case are those due to two or more errors in the 12-bit data words.) In the ideal case, the PCR figures for bit error rates of 0.001 and 0.01 are 99.869% and 88.35%. To summarize, the leading flag framer (Method 1) and the illustrated embodiment of the present invention (Method 2) have the following packet completion rates:

TABLE I

| BER | Method 1 | Method 2 | Ideal |
|---|---|---|---|
| .001 | 97.89 | 99.868 | 99.869 |
| .01 | 72.26 | 87.85 | 88.35 |

From the foregoing, it will be recognized that the present invention provides an important improvement in framing technology by which substantial increases in packet completion rates can be achieved. The invention does not require use of additional dedicated flag signals and, in fact, can permit existing flag signals to be shortened while still yielding performance improvements. If desired, dedicated flag signals between packets can be eliminated entirely and framing can be accomplished solely with reference to the expected data bits. Since nearly ten percent of the data bandwidth of the illustrated packet protocol is dedicated to flag sequences, their elimination can yield an immediate, substantial increase in data throughput.

Having described and illustrated the principles of my invention with reference to a preferred embodiment, it will be recognized that the invention can be modified in arrangement and detail without departing from such principles. For example, while the invention has been illustrated with reference to one particular protocol, it will be recognized that the invention can be applied to any situation in which the receiver knows, or can determine (either in advance or in real time), some characteristic of the received data. Further, while the invention has been illustrated with a sparse gate implementation in which selected, fixed bits of the shift register are applied to the framer circuit 26, in alternative embodiments all the shift register bits can be applied to comparator circuits, and a correspondingly long mask word can be used to make certain comparisons irrelevant. By use of such a mask word implementation, the particular bits that are monitored for expected values can be varied dynamically. Thus, the framer might compare different bits when receiving a control packet than when receiving a message packet.

In view of the many possible embodiments to which the principles of my invention may be put, it should be recognized that the detailed embodiment is illustrative only and should not be taken as limiting the scope of my invention. Rather, I claim as my invention all such embodiments as may come within the scope and spirit of the following claims and equivalents thereto.

I claim:

1. A data communications framing method comprising the steps:

anticipating particular variable data bits to be sent in a desired packet of data;

framing the desired packet of data in a received signal by detecting the anticipated data bits in predetermined bit positions therein;

producing a first logic signal in response to detection of the anticipated pattern of data bits in predetermined bit positions;

detecting in the received signal a known pattern of flag bits that typically precede a data packet in predetermined bit positions, and producing a second logic signal in response thereto;

detecting in the received signal a known pattern of flag bits that typically follow a data packet in predetermined bit positions, and producing a third logic signal in response thereto; and producing a signal indicative of proper framing by logically ORing the first, second and third signals together.

2. A data communications framing method comprising the steps:

anticipating particular variable data bits to be sent in a desired packet of data;

framing the desired packet of data in a received signal by detecting the anticipated data bits in predetermined bit positions therein;

producing a first logic signal in response to detection of the anticipated pattern of data bits in predetermined bit positions;

detecting in the received signal a known pattern of flag bits that typically precede a data packet in predetermined bit positions, and producing a second logic signal in response thereto;

detecting in the received signal a known pattern of flag bits that typically follow a data packet in predetermined bit positions, and producing a third logic signal in response thereto; and producing a signal indicative of proper framing in response to any two of the first, second and third logic signals.

* * * * *